(12) United States Patent
Lee et al.

(10) Patent No.: US 10,523,884 B2
(45) Date of Patent: Dec. 31, 2019

(54) HIGH DYNAMIC RANGE IMAGE SENSOR

(71) Applicant: Voxtel, inc., Beaverton, OR (US)

(72) Inventors: Adam Lee, Portland, OR (US); George Williams, Portland, OR (US); Jehyuk Rhee, King City, OR (US)

(73) Assignee: LadarSystems, Inc., Beaverton, OR (US)

( * ) Notice: Subject to any disclaimer, the term of this patent is extended or adjusted under 35 U.S.C. 154(b) by 646 days.

(21) Appl. No.: 14/609,295

(22) Filed: Jan. 29, 2015

(65) Prior Publication Data

US 2017/0085819 A1 Mar. 23, 2017

Related U.S. Application Data

(63) Continuation-in-part of application No. 14/548,172, filed on Nov. 19, 2014, now Pat. No. 9,810,777, which is a continuation-in-part of application No. 14/526,340, filed on Oct. 28, 2014, now Pat. No. 9,591,238.

(60) Provisional application No. 62/065,508, filed on Oct. 17, 2014, provisional application No. 62/040,623, filed on Aug. 22, 2014.

(51) Int. Cl.
*H04N 5/378* (2011.01)
*H04N 5/3745* (2011.01)

(52) U.S. Cl.
CPC .......... *H04N 5/378* (2013.01); *H04N 5/3745* (2013.01); *H04N 5/37455* (2013.01)

(58) Field of Classification Search
CPC ... H04N 5/378; H04N 5/37455; H04N 5/3745
See application file for complete search history.

(56) References Cited

U.S. PATENT DOCUMENTS

| | | |
|---|---|---|
| 8,581,168 B2 | 11/2013 | Linder |
| 9,197,233 B2* | 11/2015 | Gaalema ................. H03M 1/12 |
| 2012/0261553 A1 | 10/2012 | Elkind |

\* cited by examiner

*Primary Examiner* — Twyler L Haskins
*Assistant Examiner* — Angel L Garces-Rivera

(57) ABSTRACT

An imaging device in accordance with the present disclosure comprises of a pixelated array of semiconductor detector elements, each of the pixels in the array having an in-pixel integrated circuit, the integrated circuit having a comparator, a readout decoder block, and an address arbitration control block. The readout decoder block reads out the integrated signals of the pixels. The address arbitration control block determines the pixel address of the pixels charging beyond a threshold voltage, the threshold exceedance determined by the comparator. The addressed pixels are provided a timestamp for each of the pixels integrating beyond the threshold voltage, the timestamp provided by an off-pixel time-to-digital converter (TDC), the value of the timestamp corresponding with the accumulated charge of the pixel.

17 Claims, 8 Drawing Sheets

HIGH DYNAMIC RANGE IMAGE SENSOR

CROSS-REFERENCE TO RELATED APPLICATIONS

This application is a continuation-in-part of U.S. patent application Ser. No. 14/548,172 filed Nov. 19, 2014 and U.S. application Ser. No. 14/526,340 filed Oct. 28, 2014 both of which claim benefit to U.S. Provisional Patent Application No. 62/040,623 filed Aug. 22, 2014 and U.S. Provisional Patent Application No. 62/065,508 filed on Oct. 17, 2014.

STATEMENT OF GOVERNMENT INTEREST

This invention was made with Government support under contract FA8650-13-C-1501 awarded by the Air Force Research Laboratory (AFRL). The Government has certain rights in the invention.

TECHNICAL FIELD OF THE DISCLOSURE

The present disclosure relates in general to imaging devices. The disclosure relates in particular to semiconductor imaging devices.

DISCUSSION OF BACKGROUND ART

In a semiconductor based imager, an array of pixels each comprise of a photosensitive junction or photodetector. When a photon with sufficient energy is incident upon, and absorbed in the structure, an electron-hole pair is created. To read resultant current from absorbed photons an amplifier is required. In CMOS devices an active pixel sensor (APS) has an integrated circuit for each pixel in the sensor with the photosensitive junction and amplifier built within the same material. In ultraviolet and infrared devices a readout integrated circuit (ROIC) is commonly used, the photodetector array and ROIC made on different materials, then bonded. One design consideration in semiconductor based imaging is dynamic range. Dynamic range is the ratio of the largest non-saturating photocurrent to the smallest detectable photocurrent. In general, a large dynamic range is desirable.

SUMMARY OF THE DISCLOSURE

The present disclosure is directed to imaging devices. In one aspect, an imaging device in accordance with the present disclosure comprises of a pixelated array of semiconductor detector elements, each of the pixels in the array having an in-pixel integrated circuit, the integrated circuit having a comparator, a readout decoder block, and an address arbitration control block. The readout decoder block reads out the integrated signals of the pixels. The address arbitration control block determines the pixel address of the pixels charging beyond a threshold voltage, the threshold exceedance determined by the comparator. The addressed pixels are provided a timestamp for each of the pixels integrating beyond the threshold voltage, the timestamp provided by an off-pixel time-to-digital converter (TDC), the value of the timestamp corresponding with the accumulated charge of the pixel.

BRIEF DESCRIPTION OF THE DRAWINGS

The accompanying drawings, which are incorporated in and constitute a part of the specification, illustrate preferred embodiments of the present disclosure. The drawings together with the general description given above and the detailed description of preferred methods and embodiment given below, serve to explain principles of the present disclosure.

DETAILED DESCRIPTION OF THE DISCLOSURE

Figure 1:
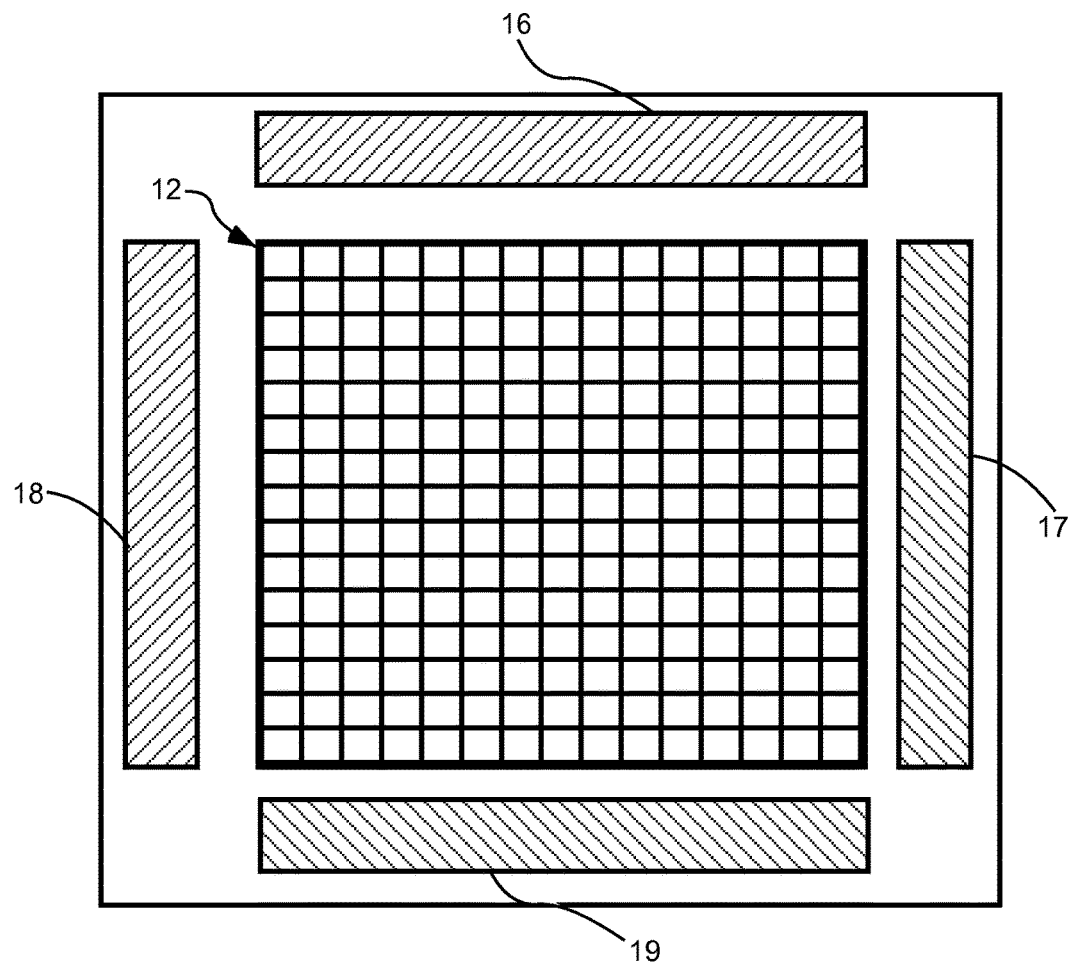
FIG. 1 is a plan view, schematically illustrating an imaging device of the present disclosure, the device comprises of a pixelated array of semiconductor detector elements, wherein each detecting element is electrically connected to an integrated circuit, a readout decoder block, the readout decoder block reading out the integrated signals of the pixels, an address arbitration control block, the address arbitration control block determining the address of pixels integrating beyond a threshold voltage, and wherein the address arbitration control block provides a timestamp for each of the pixels integrating beyond the threshold voltage.

Referring now to the drawings, wherein like components are designated by like reference numerals. Methods and embodiments of the present disclosure are described further hereinbelow.

FIG. 1 schematically illustrates an imaging device 10A. Device 10A comprises of a pixelated array 12 of detector elements, each of the pixels in the array have an in-pixel integrated circuit, the integrated circuit having a comparator. The device further comprises a readout control block and an address arbitration control block. The readout control block has a row decoder 18 and a column decoder 16. The address arbitration control block has a row arbiter 17 and a column arbiter 19. The readout decoder block reads out the accumulated charge, or integrated signals, of the pixels. The addressed pixels are provided a timestamp for each of the pixels integrating beyond the threshold voltage, the timestamp provided by an off-pixel time-to-digital converter (TDC), the value of the timestamp corresponding with the accumulated charge of the pixel.

In one embodiment, within an imaging frame, the address arbitration control block causes the integrated circuitry to stop charge accumulation for those pixels reaching the threshold signal, the accumulated charge corresponding with the timestamp. The accumulated charge is then readout by the readout control block during the readout protocol. In another embodiment, the pixel self-resets when reaching the threshold and off-pixel circuitry counts and provides a timestamp for each reset event. Residual charge accumulation is readout at the end of the frame. In yet another embodiment, the address arbitration control block causes the pixel reaching the threshold signal to reset with off-pixel circuitry. As before off-pixel circuitry counts the number of times the pixel is reset, but here the pixel is reset with a signal coming off-pixel. As before, the residual accumulation at the end of the frame is readout at the end of the frame.

The readout decoder block is capable of typical readout speeds in the megahertz (MHz), for example the readout decoder block can operate at about 20 MHz, the readout of the entire array dependent upon the pixelated array size. Here the pixelated array is shown as a 15 by 15 array for illustrative purposes only. In practice the number of pixels in the array is larger, but can also be smaller. The pixelated array, integrated circuitry details, and operation are discussed further hereinbelow.

Pixelated array 12 is made from a photosensitive material referred herein as photodetector material. The photodetector can be made from any photosensitive semiconductor material which can be pixelated. Alternatively the photosensitive material can be made from nanocrystals. Non-limiting examples of photosensitive semiconductor material include germanium (Ge), indium gallium arsenide (InGaAs), indium antimode (InSb), indium phosphide (InP), mercury cadmium telluride (HgCdTe), silicon (Si), group III-V, II-VI super lattice, quantum well detector, or any combinations thereof. Each semiconductor type has spectral response which allows detection at various spectral bands from x-ray to infrared. Spectral response of the photodetector materials can be extended or modified by implementing coatings or scintillators. Coating include antireflection coating, reflection coating, bandpass, bandstop, shortpass, longpass, notch, and other such spectral filtering and combinations thereof. Scintillators allow up-converting or down-converting of otherwise undetectable wavelengths to wavelengths detectable to the particular photodetector material.

One preferred photodetector material is indium gallium arsenide (InGaAs) with spectral sensitivity from about 900 nanometers (nm) to about 1700 nm. Removal of the substrate, also known as back-thinning, supporting the InGaAs detector materials allows extended spectral sensitivity down to 500 nm and below. Another preferred photodetector material is mercury cadmium telluride (HgCdTe). Similarly, back-thinning of HgCdTe allows extended sensitivity into the visible wavelength region.

When the photodetector material is made from ultraviolet, near-infrared, or infrared sensitive semiconductor material, other than silicon, a separate readout integrated circuit (ROIC) must be manufactured and attached to the pixel array using such methods as solder bump bond hybridization. If the photodetector material is silicon, then the circuit can be integrated within the silicon, although silicon based devices can also use a separate integrated circuit. The ROIC or the monolithic device can be manufactured with well-known silicon based photolithography techniques such as those developed in CMOS technology. Additionally the circuitry can be manufactured via 3D electronics packaging techniques such as edge-wiring or vertically stacking with through-silicon via (TSV) technology.

Other methods to increase spectral performance of the device, in addition to the aforementioned material types, coating, and scintillators, is based on the material thickness. The thickness of the photodetector material will have an effect on the spectral range of the imaging device based on the photodetector absorption length. Back thinning or wafer removal techniques allow for increased spectral response for materials which have a short absorption length in the desired spectral range. Alternatively, thick substrates are desirable when the absorption length of the photodetector material is long.

Additional techniques to increase performance of the device is reduction of noise. Cooling decreases dark current of the photodetector material. Cooling can be achieved by heat exchangers such as fins, fans, thermoelectric coolers (TEC), coolant pumping, or reservoirs carrying colds liquid, such as a liquid nitrogen dewar. For instance, when InGaAs photodetector material is used with thermoelectric cooling (TEC), or other equivalent cooling methods, dark current noise is decreased by about half with every 7° of cooling.

Figure 2:
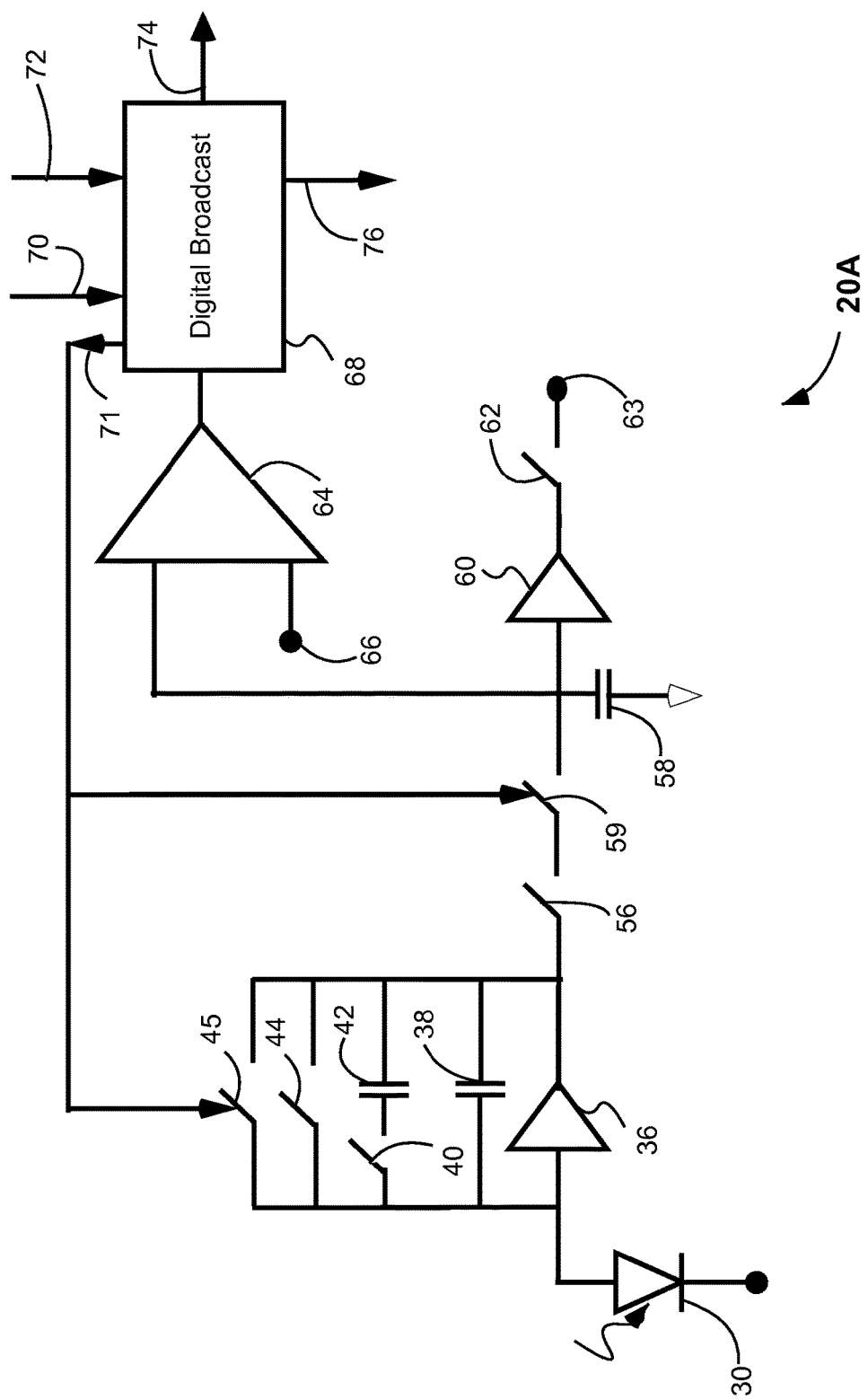
FIG. 2 is an electrical diagram of a configuration of the integrated circuitry of the imaging device of the present disclosure, wherein the address arbitration control block provides the time-stamp for the pixels integrating beyond the threshold voltage and causes the pixel to be held in reset.

FIG. 2 is an electrical diagram of an integrated circuit 20A of the present disclosure. One of the photosensitive pixels in the pixel array is represented by a photodiode 30. Here, integrated circuit 20A has a capacitive transimpedance amplifier (CTIA), although other designs could be implemented such as source follower per detector (SFD) or direct injection (DI). The CTIA comprises of an amplifier 36, in parallel with; a capacitor 38, an optional switch 40 in series with a capacitor 42, a frame-reset switch 44, and a pixel-reset switch 45. Optional switch 40 allows increased capacitance in parallel with amplifier 36, thereby decreasing gain of the amplifier and increasing the well capacity of the pixel. With increased in-pixel circuitry, additional capacitors and switches can be added in parallel to allow more gain levels.

A shutter switch 56 and an integration disable switch 59 are closed during integration allowing charge accumulation on a hold capacitor 58. Either integrate up or integrate down charge accumulation scheme can be implemented. Opening shutter switch 56 isolates the signal on hold capacitor 58 from the pixel amplifier to allow readout. During readout frame-reset switch 44 is globally closed for all of the pixels in the array and thus resetting the CTIA circuit for each of the pixels. Readout is performed through a buffer 60, and a signal select switch 62. The readout circuit delivers the signal to a column wire 63 when signal select switch 62 is closed via clocking signals sent from the readout control block. After readout of the pixels, frame-reset switch 44 is globally closed. Here, the readout routine is standard raster scan readout of the passive path, although other routines could be implemented. Integrate then read (ITR) is implemented here, but integrate while read (IWR) can be implemented without departing from the present disclosure. Likewise, additional passive imaging circuitry known in the art can be added. For example active correlated double sampling (CDS) or passive CDS can be implemented.

A comparator 64 has an externally controllable threshold voltage 66. The threshold voltage is preferably set within the linear region of the amplifier, below the saturation level. During operation capacitor 58 accumulates charge. If the charge accumulates beyond the threshold voltage then comparator 64 passes a signal to a digital broadcast circuitry 68. Digital broadcast circuitry 68 signals a row request 74 off-pixel to the address arbitration control block which in turn determines the address of the pixel by row and then by column. One example of digital address arbitration circuitry and operational detail is provided in U.S. patent application Ser. No. 14/526,340 commonly owned by the assignee of the present disclosure and hereby incorporated by reference in its entirety for the purpose of explaining address arbitration.

In this embodiment, the digital broadcast circuitry and address arbitration control block determines the address of the pixel, and the timestamp is provided off-pixel. The time-stamp corresponds to a disable signal 70, the disable signal originating off-pixel sent to the digital broadcast circuitry 68. With receipt of the disable signal, digital broadcast circuitry 68 opens integration disable switch 59. Opening switch 59 stops charge accumulation on hold capacitor 58, the value of which corresponds to the timestamp. Simultaneously with the opening of switch 59, or shortly after, a signal is sent to pixel-reset switch 45, closing the switch. At the end of the frame the readout decoder block globally opens isolation switch 56, closes frame-reset switch 44 and causes pixel-reset switch 45 to open and integration disable switch 59 to close. The value on hold capacitor 58 is readout identically as that described above. After readout of the pixelated array, frame-reset switch 44 opens and shutter switch 56 closes allowing another frame integration.

The digital broadcast circuitry and address arbitration control block prevent saturation of the pixel, yet retains signal information of the pixel. By providing the address, timestamp, and signal level corresponding with the timestamp, the predicted integrated charge of the pixel can be extrapolated. For instance, the predicted integrated charge can be determined with linear extrapolation.

Figure 3:
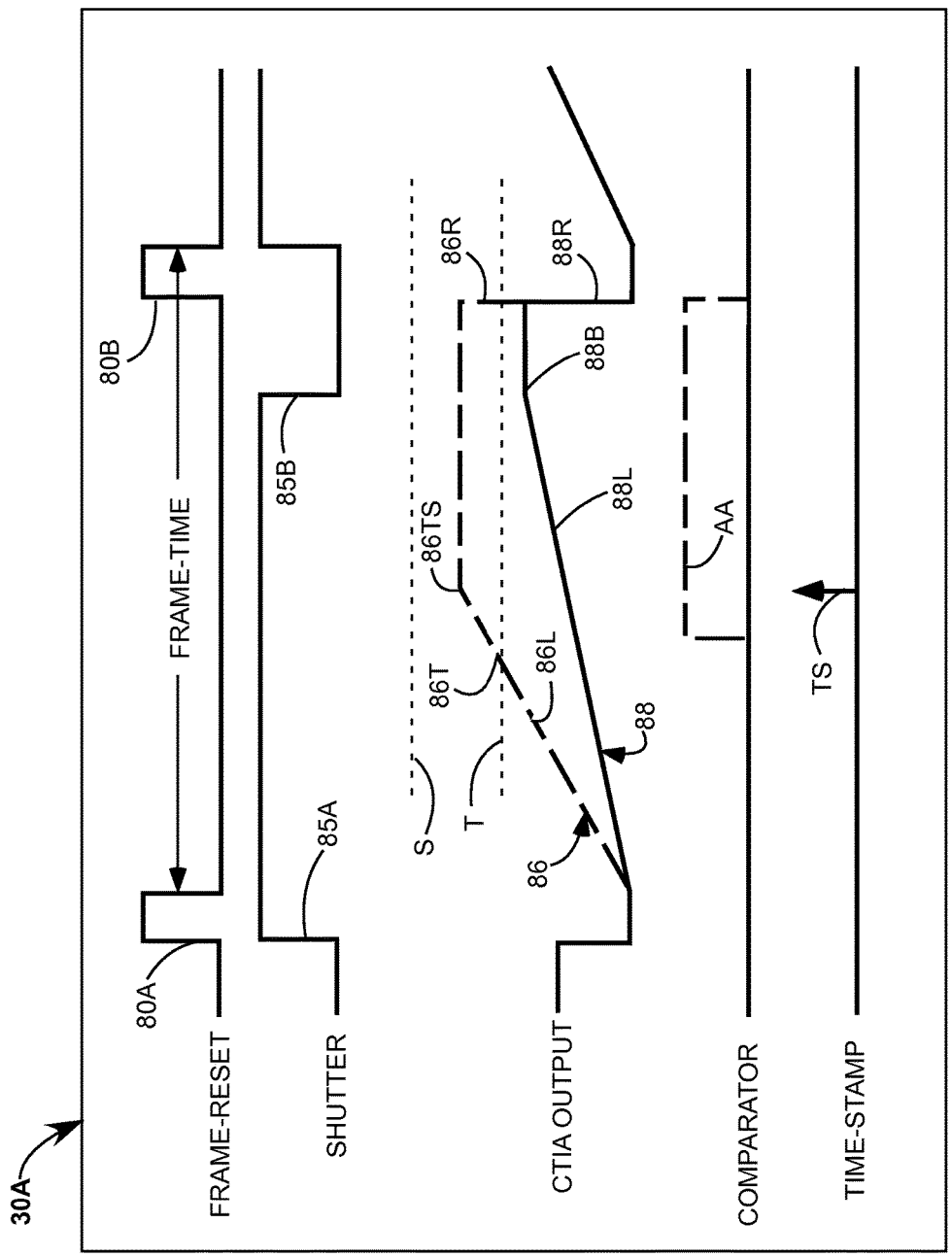
FIG. 3 is a timing diagram illustrating operation of the device of that shown in FIG. 2.

FIG. 3 is a diagram illustrating an operational timing 30A of the circuit of FIG. 2. A single frame is the period between a frame-reset signal 80A and a frame-reset signal 80B. Frame-reset signal 80A is released charge accumulates at the beginning of the frame. Frame-reset signal 80A and frame-reset signal 80B define the frame-time duration. A shutter period is the time that the isolation switch is closed. A shutter-start 85A coincides with frame-reset signal 80A and a shutter-stop 85B terminates before the end of the frame-time to allow readout of the pixels before frame-reset signal 80B.

The CTIA output is representative of the charge accumulation integrated on the hold capacitor. A non-saturating charge accumulation 88 is shown as a solid line. After reset signal 80A, charge accumulates at the beginning of the frame. Assuming a steady signal upon the pixel, the integration has a linear region 88L which continues to integrate the signal until a shutter-stop 88B. The accumulated signal 88B, below threshold voltage T, is then read out. Reset signal 80B resets the pixel for another frame, shown by a CTIA drop 88R. A potentially saturating charge accumulation 86 is shown as a short-long dashed line. Here, charge accumulation 86 has a linear region 86L. The charge accumulates and reaches threshold T at a threshold event 86T. The comparator then signals to the digital broadcast circuitry. The digital broadcast circuitry determines the address of the pixel as described above. While the address arbitration control block is operating, the hold capacitor continues to charge until a time-stamp TS is provided and the off-pixel disable signal causes further integration to stop. It can be observed that the charge would saturate at a pixel saturation level S but for the disable signal. The hold capacitor then retains the signal for readout after the shutter period is over. Reset signal 80B resets the pixel shown by a CTIA drop 86R as described above.

Each pixel that integrates beyond the threshold is serviced by the address arbitration control block sequentially. As such, the threshold voltage should be set to a value based on expected operating conditions. In general the threshold voltage should be set close to the saturation value, leaving sufficient buffer for the continued integration during address arbitration and disable signal. If numerous pixels are expected to reach the threshold voltage, the threshold voltage should be set low enough such that the address arbitration control block will be able to service all those pixels before saturation. The address arbitrators advance at a rate of about a couple hundred picoseconds per row or column. The timestamp delay and jitter depends on the scan time of the device, which in turn depends on the pixel array size. In some applications it may be desirable to prioritize and deprioritize readout of pixels with various tree and hierarchical decoder and arbitration configurations. For instance if pixels are expected to saturate in a spatially separated first and a second area in the pixelated array, it may be desirable to prioritize readout of some pixels in the second group after readout of one or more pixels in the first group.

Optionally, to increase address arbitration speed of the array, the address arbitration control block may comprise of a plurality of row arbiters and column arbiters. For instance the row arbiter can be subdivided into four row sub-arbiters and the column arbiters can be subdivided into four column sub-arbiters. Each row and column sub-arbiter pair can then service a quadrant of the array. Arbitration of each quadrant substantially the same as described above within each pixel area. Subdividing the row and column decoders allows for reduced arbitrator service areas to about 25% of that with only a single row and single column arbiter. Reduction of the service area decreases timestamp delay and jitter associated with scanning the pixelated array. The row and column arbiter are preferably located adjacent to the serviced pixel area to allow the shortest electrical path from pixel area to arbitrators. Each of the pixel areas can be readout asynchronous from another. Similarly, the readout decoders can be subdivided for increased readout speed of the device.

Figure 4:
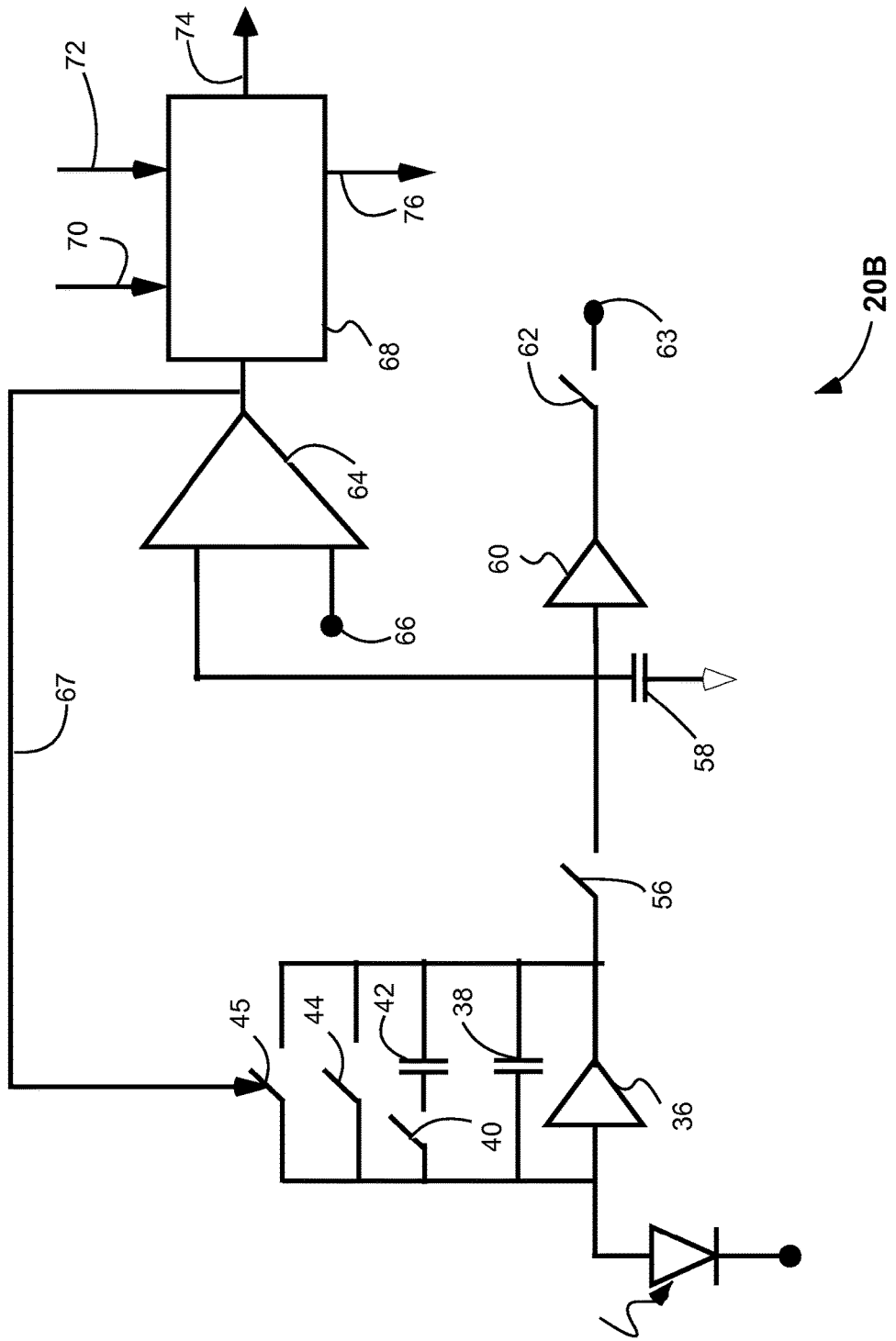
FIG. 4 is an electrical diagram of another configuration of the integrated circuitry of the present disclosure, wherein charge accumulation within the pixel is reset automatically, by the in-pixel circuitry.
Figure 5:
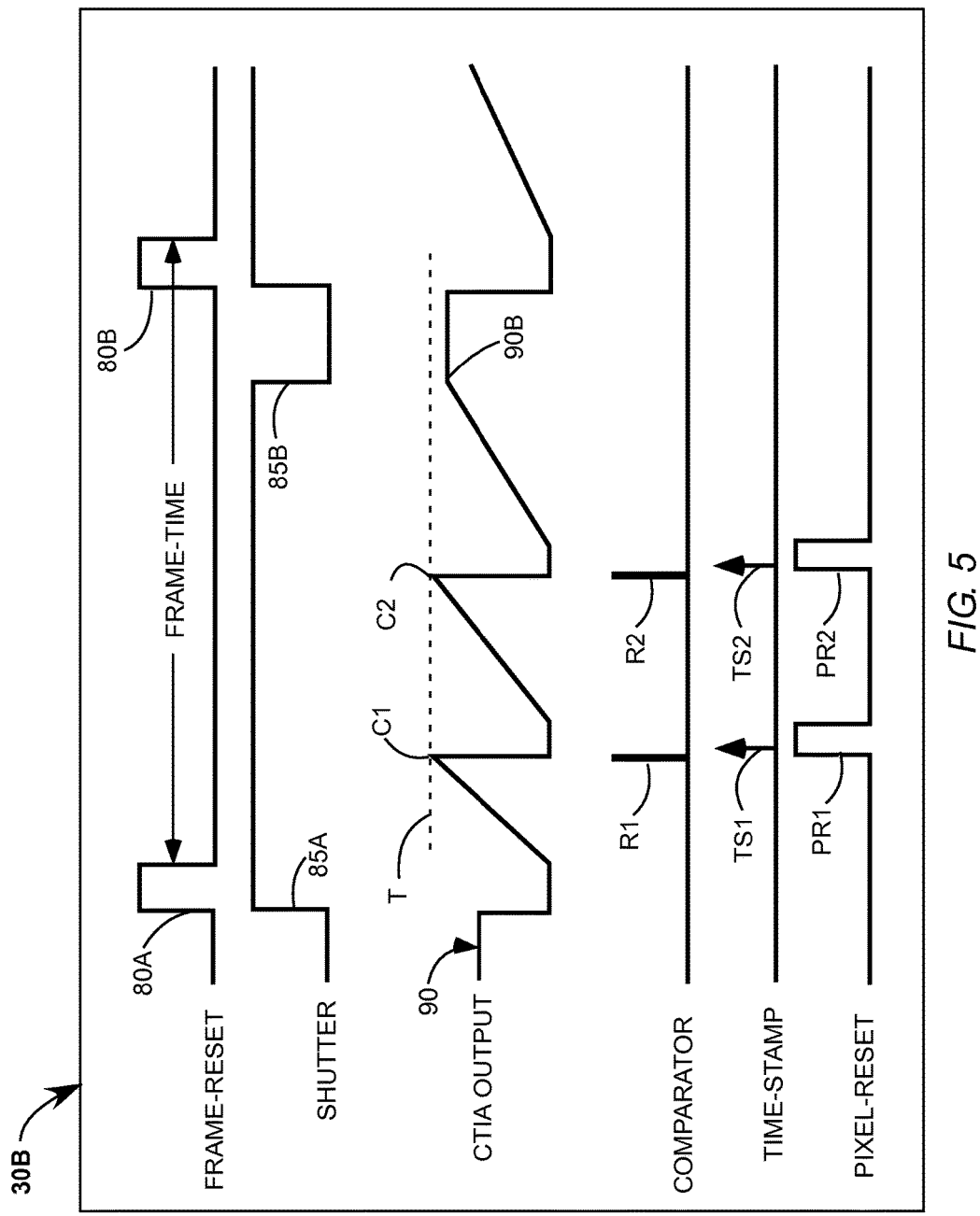
FIG. 5 is a timing diagram illustrating operation of the device of that shown in FIG. 4.

FIG. 4 is an electrical diagram of an integrated circuit 20B which has in-pixel self-reset. FIG. 4 is similar to that shown in FIG. 2, except here, the pixel reset circuitry is enabled with comparator output, without off-pixel signals initiating the reset. FIG. 5 is a diagram illustrating an operational timing 30B of the integrated circuit of that shown in FIG. 4. The frame-reset and the shutter operate substantially the same as that described above and shown in FIG. 3. Referring to FIG. 4 and FIG. 5, operation detail is given below.

In this embodiment, when CTIA output 90 integrates charge to threshold voltage T, comparator 64 signal R1 resets the pixel by closing pixel-reset switch 45 and signal digital broadcast circuitry 68 simultaneously. The digital broadcast circuitry determines the address of the pixel and circuitry off-pixel counts a threshold event C1 and associates the event with a timestamp TS1. A pixel-reset signal PR1 holds pixel-reset switch 45 closed for a short period to allow the capacitors to drain, resetting the pixel, then pixel-reset switch 45 opens. In this configuration pixel-reset switch 45 can be held by holding the comparator high or implementing a delay circuit to hold reset switch 45 closed for sufficient time to reset the pixel. A CTIA output 90 integrates, reaching the threshold voltage and causes comparator 64 to signal R2 the digital broadcast circuitry which in turn provides timestamp R2 and counts threshold event C2. Pixel-reset PR2 is held closed for a short period, as before with sufficient time to reset. After reset, CTIA output 90 again integrates the signal, here shutter 85B stops integration at a point 90B, opening isolation switch 56. The residual accumulated charge is stored on the hold capacitor and read out. Readout of the residual charge and of other pixels is substantially the same as described in the previous embodiment.

With the automatic reset circuitry described above, the temporal profile of the potentially saturating signal can be reconstructed. With the threshold voltage, the number of counts, the timestamps associated with the counts, and the residual charge accumulation the accumulated charge profile can be reconstructed. Known reset and other lag times can be calibrated out of the system for increased accuracy. Likewise variations in threshold signal levels can be calibrated pixel-by-pixel with a calibration table. Alternatively the off-pixel circuitry can only the number of threshold events with no timestamp provided. The temporal profile would then be based on the number of threshold events and the threshold voltage.

As described above, the address arbitration control block can service a single pixel at a time. In applications and operating conditions in which pixels are expected to saturate a plurality of row and column arbiters can be implemented. Alternatively, longer reset time can be implemented such that the pixels reaching the threshold voltage are delayed before they can integrate again. Implementing a delay or limiting the number of integrations can relieve burden on the address arbitration control block when multiple pixels are potentially saturating, or any of the pixels are demanding continued service of the address arbitration control.

Figure 6:
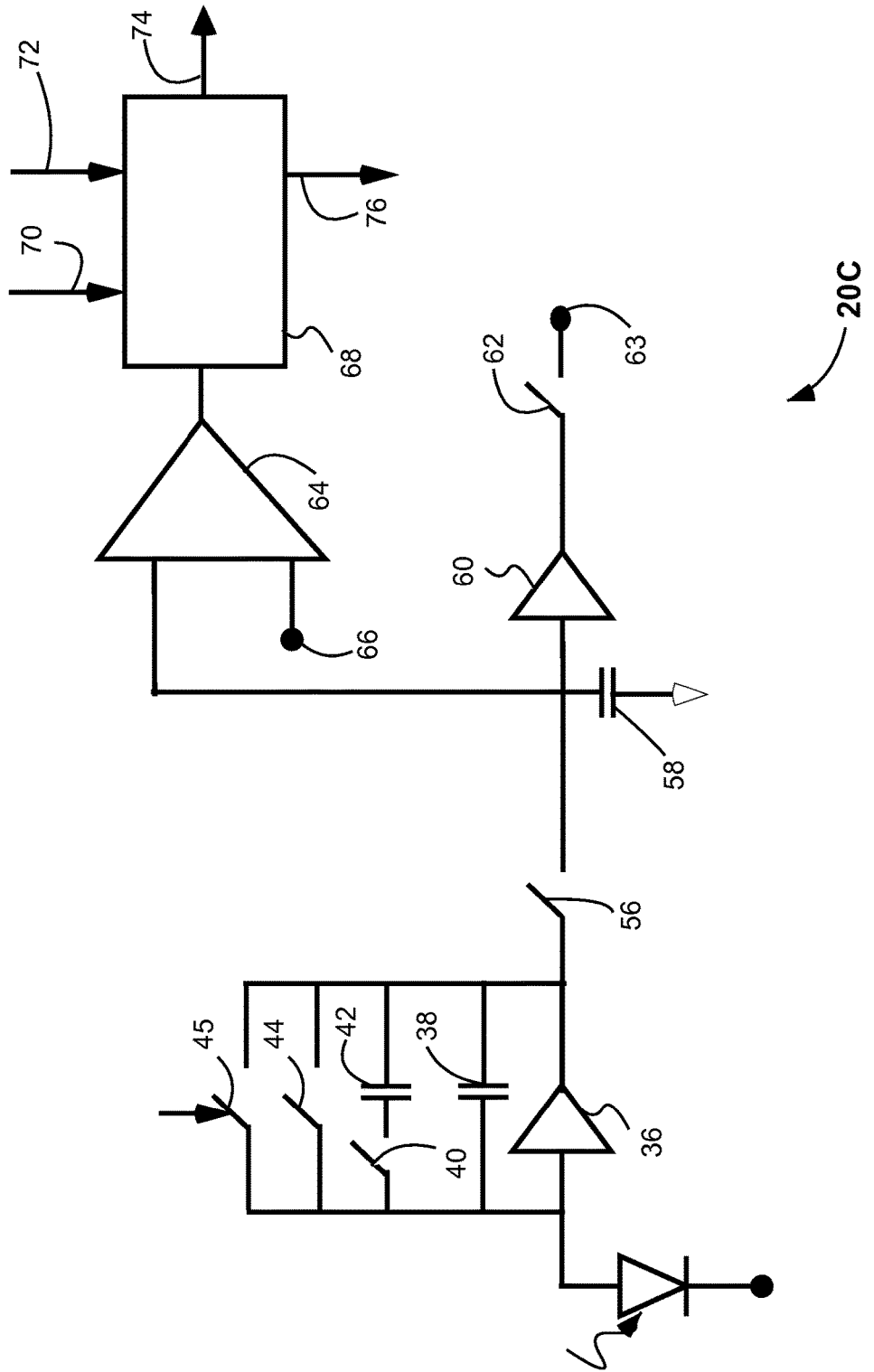
FIG. 6 is an diagram of the configuration of the integrated circuitry of the imaging device of the present disclosure.
Figure 7:
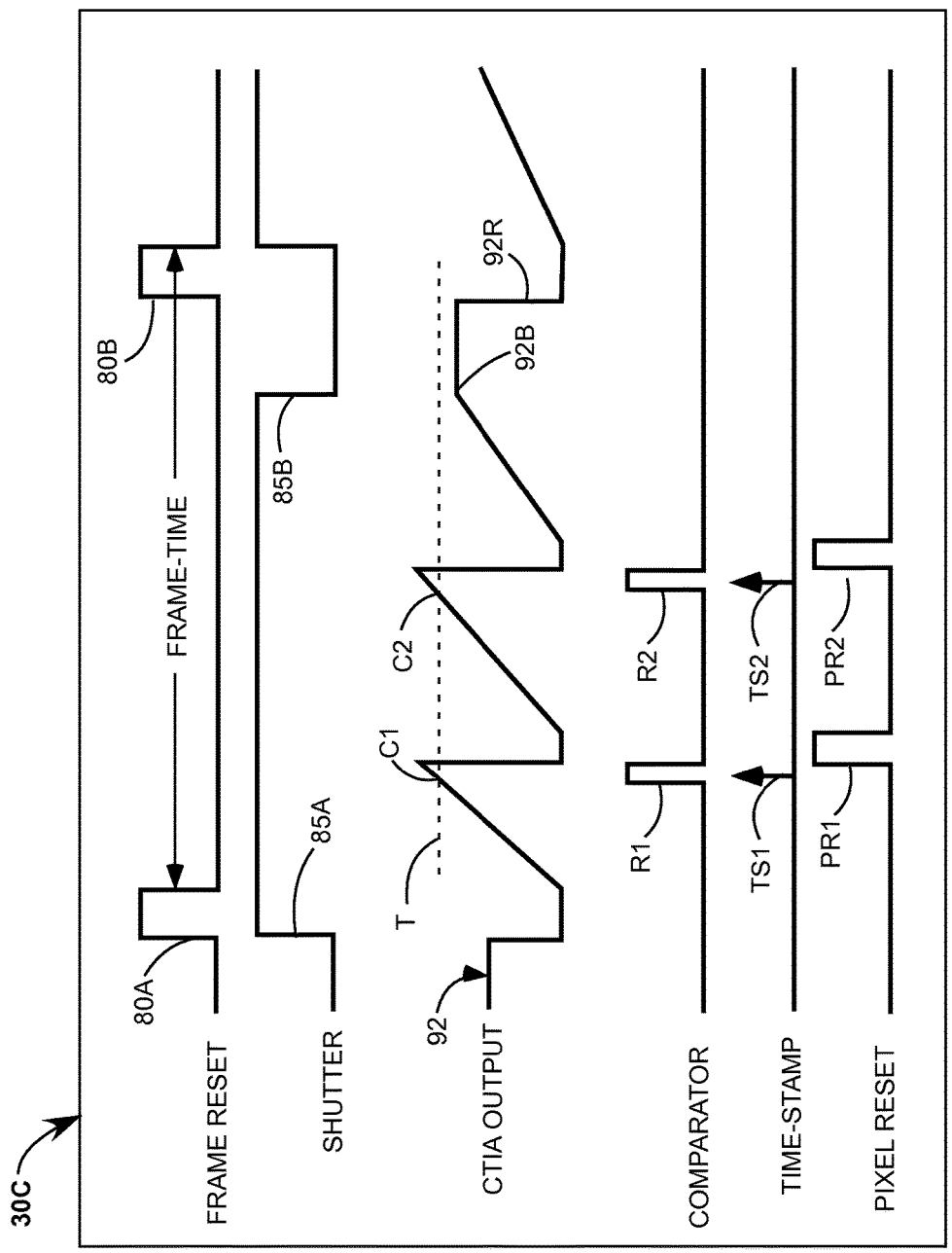
FIG. 7 is a timing diagram illustrating operation of the device of that shown in FIG. 6.

FIG. 6 is an electrical diagram of an integrated circuit 20C which has off-pixel reset and does not have the disable switch as that seen in FIG. 2. FIG. 7 is a diagram illustrating an operational timing 30C of the integrated circuit of that shown in FIG. 6. The frame-reset and the shutter operate substantially the same as that described above and shown in FIG. 5, except here, the reset signal is not automatic, but driven off-pixel. Referring to FIG. 6 and FIG. 7, operation detail is given.

Here, when a CTIA output 92 integrates charge to threshold voltage T, comparator 64 signals digital broadcast circuitry 68. The digital broadcast circuitry, with the arbitration control block, determines the address of the pixel and off-pixel circuitry counts threshold event C1 and provides timestamp PR1, corresponding to count C1. Additionally off-pixel circuitry signals pixel-reset PR1, holding pixel-reset switch 45 closed for a short period to allow the CTIA to reset, substantially the same as described before. In this configuration the pixel is not reset automatically, and thus CTIA output continues to integrate until off-pixel circuitry provides the reset circuitry. After pixel-reset, CTIA output 92 integrates again, the operation substantially similar as described above with pixel-reset signal PR2 coming off-pixel. As in the previous embodiment described in FIG. 4 and FIG. 5, CTIA output 92 again integrates the signal, shutter 85B stops integration at a point 92B, opening switch 56. The accumulated charge is stored and read out during until the frame is reset at point 92R.

In this embodiment, the pixel-reset is off-pixel which causes a longer delay to reset the pixel for another integration within the frame. The delay caused by the need for off-pixel circuitry to signal the reset switch. Allowing off-pixel circuitry to reset the pixels allows the address arbitration control block to service pixels more quickly since the address arbitration control block is not burdened with delivering reset signals. The off-pixel reset switch is fanned out separate from the address arbitration control block circuitry.

As before the temporal profile can be constructed based on the number of threshold events, threshold value and corresponding timestamp. Alternatively, the profile can be constructed based on the number of threshold event and threshold value.

The disclosed imaging device has a variety of useful applications. In general it can be used in any imaging application. It is especially well suited for applications which require high dynamic range. One such application is hyperspectral imaging (HSI). In hyperspectral imaging both spatial and spectral data is collected. In one implementation a dispersive element is placed in front of the pixelated array such that electromagnetic radiation is angularly dispersed and separated when imaged along either row or columns pixels. Spatial data is imaged in the transverse column or row, respectively. In order to get a full 2D image, the scene is scanned, collecting data in a push-broom manner. Such an implementation allows collection of two spatial dimensions along with spectral data. In hyperspectral imaging, the spectral signature of objects and scenes to be imaged can vary greatly. Such variations require an imaging device capable of high dynamic range.

Figure 8:
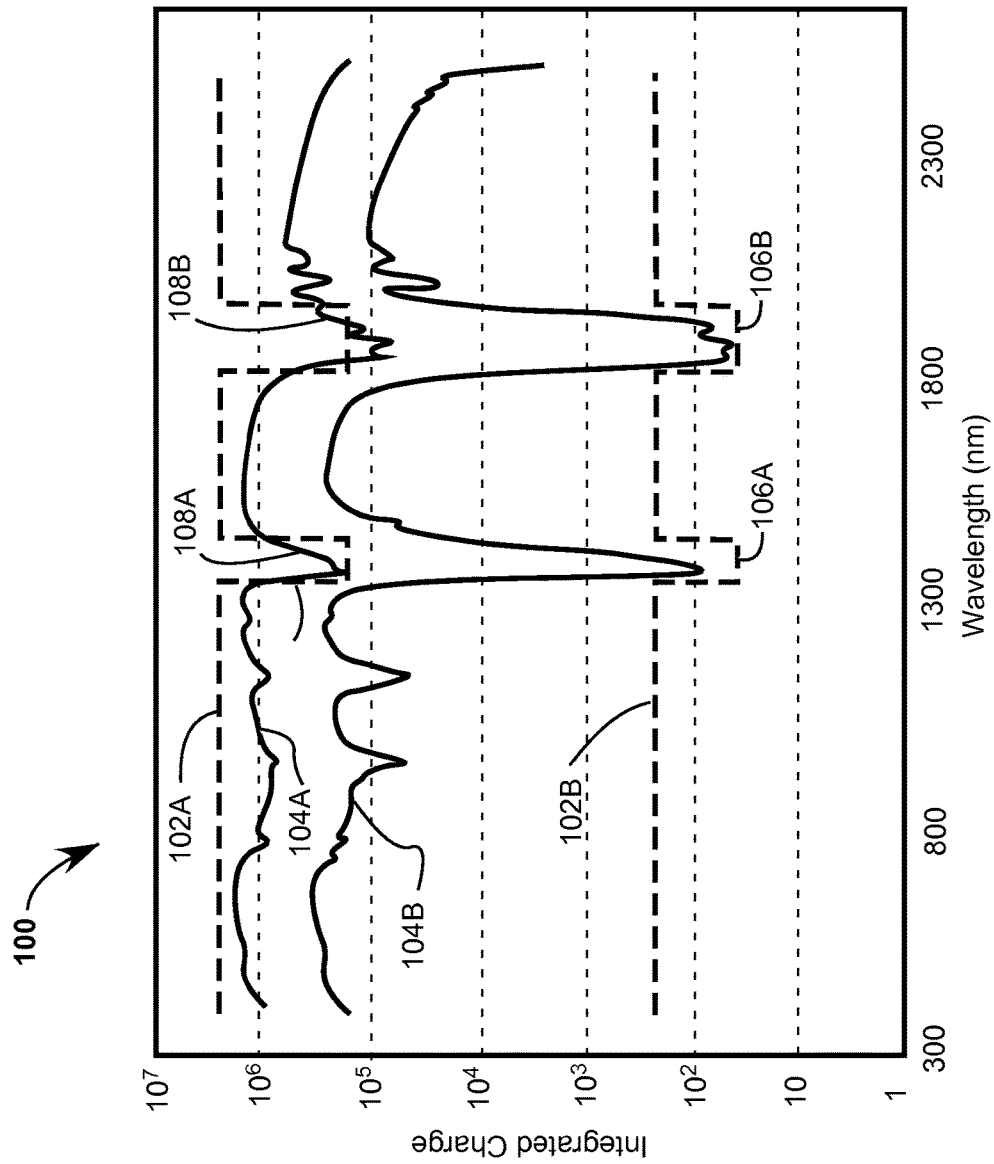
FIG. 8 is a graph of accumulated charge versus wavelength of a row or column in a hyperspectral imaging application.

FIG. 8 is a spectral graph 100, showing the integrated charge verse wavelength in a hyperspectral imaging application. Here, the photodetector material is mercury cadmium telluride (HgCdTe), backthinned to allow spectral response in the visible wavelength region. The dynamic range of the device is defined by a saturation level 102A and a noise floor 102B. The noise floor represent the minimum detectable signal. A max signal 104A is the maximum expected signal and a min signal 104B is the minimum expected signal for the HIS application. At about 1400 nanometers (nm) and about 1900 nm the minimum expected signal is below the noise floor with low gain. In order to detect those regions the CTIA high gain is used which allows a lower minimum detectable signal in a region 106A and 106B which allows the noise floor to drop below those low signals. In turn the maximum detectable signal also drops. Large signals in a spectral area 108A and 108B would normally saturate, but here, implementation of the any of the described embodiments effectively prevents saturation by detecting the threshold voltage, set below saturation, and either time stamping and holding the charge for readout, or alternatively counting the threshold event, time stamping the event, and resetting the pixel, From the description of the present disclosure provided herein one skilled in the art can design the imaging devices in accordance with the present disclosure. For instance one skilled in the art could use SPICE software to simulate and verify designed circuitry. Other design software and chip layout with software is available from a variety of suppliers such as Cadence Design Systems, Tanner EDA, Silvaco, Inc., Synopsys, Inc., and Mentor Graphics Corp. Coordination of design and fabrication can be accomplished at any commercial semiconductor integrated circuit fab, integrated device manufacturers, or pure-play semiconductor foundries.

While the present disclosure has been described in terms of particular photodetector materials, circuitry, and operational logic, others can be implemented without departing from the disclosure. In summary, the present invention is described above in terms of particular embodiments. The invention, however, is not limited to the embodiments described and depicted herein. Rather, the invention is limited only by the claims appended hereto.

What is claimed is:
1. A imaging device, the device comprising:
   a pixelated array of detector elements, each of the pixels in the array having an integrated circuit, the integrated circuit having a comparator;
   a readout decoder block, the readout decoder block reads out the integrated signals of the pixels;
   an address arbitration control block, the address arbitration control block determines the pixel address of the pixels charging beyond a threshold voltage held by the comparator; and
   wherein the addressed pixels are provided a timestamp by an off-pixel time-to-digital converter (TDC), the timestamp corresponding with the accumulated charge of the pixel, and wherein the address arbitration control block causes an offset voltage to be applied to the charge accumulation of pixels reaching the threshold voltage and the digital counter counts the number of times the offset is applied.

2. The device of claim 1, wherein the integrated circuitry of the pixel to stops further charge accumulation for those pixels integrating beyond the threshold voltage, thereby holding the accumulated charge corresponding to the timestamp for readout by the readout decoder block.

3. The device of claim 1, the device further comprising a digital counter.

4. The device of claim 3, wherein the address arbitration control block resets pixels reaching the threshold voltage and the digital counter counts the number of times the pixel is reset.

5. The device of claim 1, wherein digital logic stores a binary value corresponding to the threshold comparator status.

6. The device of claim 1, wherein the comparator services a column of the pixels.

7. The device of claim 1, wherein a plurality of time-to-digital converter is employed, the time-to-digital converters each associated with a column of pixels.

8. The device of claim 1, wherein the voltage threshold is adjustable individually or in the aggregate.

9. The device of claim 1, wherein the pixelated array is made from a material from the group consisting of indium gallium arsenide (InGaAs), silicon (Si), mercury cadmium telluride (HgCdTe), indium antimony (InSb), a group III-V, II-VI super lattice, quantum well detector, or any combinations thereof.

10. The device of claim 1, wherein the pixelated array is made from semiconductor nanocrystals.

11. The device of claim 1, wherein the device circuits and detector elements are made within the same substrate.

12. The device of claim 1, wherein the pixelated array is thinned to less than 500 microns thickness and optical radiation enters the device from the side opposite from that containing circuits.

13. The device of claim 1, wherein the circuits of the device are fabricated using CMOS processing.

14. The device of claim 1, wherein the circuits of the device are fabricated in separate wafers and electrically connected.

15. The device of claim 1, wherein the gain-bandwidth properties of a passive signal paths is adjustable, individually or in aggregate.

16. The device of claim 15, wherein the gain-bandwidth properties of the passive path is adjusted based on the pixels reaching the threshold voltage.

17. The device of claim 1, wherein the detector is sensitive to electromagnetic radiation regions from the group consisting the x-ray, ultraviolet, visible, near-infrared, short infrared, mid-infrared, long infrared, or combinations thereof including laser-lines within those regions.

* * * * *